United States Patent Office 2,923,665
Patented Feb. 2, 1960

2,923,665

PROCESSES FOR PREPARING HUMAN PLASMINOGEN FROM HUMAN PLACENTA SOURCES

James Joyce Hagan, Cedar Grove, and Ralph Edward Clarke, Westwood, N.J., and Frank B. Ablondi, Pearl River, N.Y., assignors to American Cyanamid Company, New York, N.Y., a corporation of Maine No Drawing. Application November 7, 1956
Serial No. 620,789

4 Claims. (Cl. 195—66)

This invention relates to a process of purifying and separating the proteolytic enzyme plasminogen originating in human placenta.

It is known that mammalian blood contains a zymogen of a proteolytic enzyme, plasminogen. Plasminogen is inactive but may be converted to the active proteolytic enzyme, plasmin, by the activator streptokinase. As is well known, plasmin lyses clotted blood and fibrinous exudates.

A composition for the treatment of infection and edema comprising human plasminogen and streptokinase is described and claimed in the copending application of Ablondi et al. Serial No. 580,177, filed April 24, 1956. This composition is quite effective in the liquefaction of clotted blood and fibrinous exudates and is of importance in the treatment of inflammations in animals.

Plasminogen exists in the euglobulin fraction of human plasma and various efforts have been directed toward the recovery and purification of this enzyme from human serum. Remmert et al. [Journal of Biological Chemistry, 181, 431 (1949)] have described a method for the purification of plasminogen from dried human plasma. The process as therein described involves the isoelectric precipitation of the enzyme from human serum by dialysis or dilution to low ionic strength followed by acidification to pH 5.3.

Human plasma, since it is derived from donor blood, is a rather expensive source of human plasminogen and efforts have been directed towards finding other and cheaper sources from which human plasminogen could be obtained.

The present invention is concerned with a novel process of preparing human plasminogen from human placenta or placental euglobulin, and particularly from fraction $III_2$ [Cohn, E.J., et al. J.A.C.S. 68, 459 (1946)]. Human placenta is an ever-available waste product of human birth and, therefore, in contrast to human whole blood or human serum, is a much more logical source of human plasminogen for veterinary use. However, the conventional techniques for extracting human plasminogen from human serum are not readily adaptable to human placenta probably because of the difference in contaminating proteins, lipids, etc., involved. Moreover, the plasminogen produced by the prior art processes is insoluble and hence cannot be readily sterile-filtered to yield a pharmaceutically acceptable product.

We have now discovered that by series of novel steps it is possible to recover human plasminogen from human placental sources in a soluble form that may be easily sterile-filtered. Essentially, the present invention involves preparing a suspension of human placenta, such as the euglobulin fraction or fraction $III_2$, in water and adjusting the pH to between 8 and 11.5 and preferably to a pH of about 11. The suspension is then acidified to a pH of between about 1 and 4. To the acidified suspension, salt such as ordinary sodium chloride, is added in sufficient quantity to obtain an ionic strength of between 0.15 and 0.70. The addition of salt is an extremely important step in the purification and extraction of plasminogen from human placenta as it greatly increases the solubility of the normally insoluble euglobulin fraction of human blood, but more importantly, it causes the impurities, which may include contaminating proteins, to be flocculated so that the resulting precipitate may be easily removed by centrifugation or other conventional techniques. The precipitated impurities are consequently removed and discarded. The pH of the supernatant liquid, and which contains the activity, is then adjusted to a pH of between 6 and 9 and preferably about 7.5 with alkali so as to keep the plasminogen in solution and to obtain a physiological pH for parenteral use. A preservative such as sodium ethylmercuricthiosalicylate may be added and the material is sterilized by filtration in a standard manner. Each cubic centimeter of material so obtained has a potency of between 400 and 800 units of human plasminogen.

In a more preferred embodiment of the present invention, the supernatant liquid containing the activity, after the removal of the flocculated impurities by centrifugation, is adjusted to a pH of about 6 and acid-washed magnesol is added. Magnesol is a synthetic hydrated magnesium silicate of the approximate composition $MgO.2.5SiO_2.H_2O$. The acid-washed magnesol is added to the supernatant liquid with stirring to form a final concentration of between 1–5%. The pH is maintained at a pH of about 4–7 for ½ hour or so with continuous stirring. The activity is almost completely adsorbed on the magnesol at a pH of around 6. At the lower concentrations of magnesol somewhat larger amounts of activity remain unadsorbed. The activity is eluted from the magnesol by an acid wash at a pH of about 2–3 or by an alkaline wash at a pH of about 10–11. Salt is now added to obtain an ionic strength as described above and the material adjusted to pH 6–9 as before. A preservative may be added and the material is sterilized by filtration in a standard manner.

As indicated above, the magnesium silicate adsorbent must be properly washed in order to adsorb properly the plasminogen and in order to make it possible to elute the activity therefrom in a satisfactory manner. This acid washing may be accomplished by suspending 50 pounds of magnesium silicate in 250 liters of distilled water containing 120 pounds of concentrated sulfuric acid. The suspension is mixed for 1 hour. The magnesium silicate is allowed to settle and most of the acid is decanted off. The magnesium silicate is washed with distilled water until the magnesium silicate is at a pH of 2.5. The water-washed magnesium silicate is then washed with acetone and air-dried.

The procedures described hereinabove provide an economical means of preparing bulk quantities of human plasminogen from human placenta in soluble form for ordinary veterinary use. The procedure without the use of the adsorbent prepares a product which is satisfactory without further purification. If a more pure product is desired, this may be readily obtained by the use of an adsorbent as described hereinabove.

By the term "salt" as used throughout the specification and claims, we mean any strong electrolyte salts such as sodium chloride, sodium nitrate, sodium bromide, potassium bromide, potassium chloride, potassium sulfate, potassium nitrate, magnesium chloride, etc., or any other physiologically acceptable strong electrolyte capable of exhibiting the desired ionic effect.

The invention will be described in greater detail in conjunction with the following specific examples.

Example 1

One and one-half kilograms of fraction $III_2$ of human placenta are suspended in 5 liters of distilled water and adjusted to a pH of 11 with 5 N NaOH. The suspension is stirred and held for about 10 minutes. The suspension is then adjusted to a pH of 3 with 6 N HCl and sodium chloride is added to obtain an ionic strength of 0.15. The precipitate which is formed is removed by centrifugation. The supernatant is clarified by filtering and the pH is then adjusted to 7.5 with 5 N NaOH and 1 gram sodium ethylmercuricthiosalicylate per 10,000 milliliters is added. The material is then sterilized by filtration in a standard manner.

*Example 2*

Two hundred grams of placental fraction III$_2$ are added to 1 liter of cold distilled water at 5–10° C. The suspension is adjusted and maintained at a pH of 10–11 with 5 N NaOH and stirred for 10 minutes. The pH is adjusted with 6 N HCl to obtain a pH of 3 and sodium chloride is added to obtain an ionic strength of 0.15. The material is centrifuged to remove the flocculated impurities. The supernatant is adjusted to pH 6 with 5 N NaOH and acid-washed synthetic hydrated magnesium silicate is added to obtain a final concentration of 3%. The pH is maintained at pH 6 for ½ hour with continuous stirring. The plasminogen is thereafter eluted from the magnesium silicate by an acid-wash at a pH of about 2–3. Sodium chloride is added to obtain an ionic strength of 0.15 and the pH is adjusted to about 7.5. Sodium ethylmercuricthiosalicylate is then added to a final concentration of 1 gram per 10,000 milliliters. The material is thereafter sterile-filtered in a standard manner.

*Example 3*

The procedure of Example 1 is repeated with the sole exception that a sufficient quantity of potassium chloride is used to obtain an ionic strength of .338. The extracted plasminogen is then sterile-filtered in the usual manner.

*Example 4*

The procedure of Example 1 is repeated with the sole exception that a sufficient quantity of magnesium chloride is used to obtain an ionic strength of 0.34. The extracted plasminogen is then sterile-filtered in the usual manner.

*Example 5*

The euglobulin precipitate from approximately 4 liters of placental extract is suspended in 1400 milliliters of water. The material is adjusted to pH 11 with 5 N NaOH and stirred for 10 minutes. The pH is adjusted to pH 2.5 with 6 N HCl and potassium chloride is added to obtain an ionic strength of 0.4. The material is centrifuged and the activity containing supernatant fluid is adjusted to pH 7.5. A preservative is added and the material is sterile-filtered in the usual manner.

*Example 6*

Two hundred grams of placental fraction III$_2$ are added to 1 liter of cold distilled water at 5–10° C. The suspension is adjusted and maintained at a pH of 10–11 with 5 N NaOH and stirred for 10 minutes. The pH is adjusted with 6 N HCl to obtain a pH of 3 and sodium chloride is added to obtain an ionic strength of 0.15. The material is centrifuged to remove the flocculated impurities. The supernatant is adjusted to pH 6 with 5 N NaOH and acid-washed synthetic hydrated magnesium silicate is added to obtain a final concentration of 3%. The pH is maintained at pH 6 for ½ hour with continuous stirring. The plasminogen is thereafter eluted from the magnesium silicate by an alkaline-wash at a pH of about 10–11. Sodium chloride is added to obtain an ionic strength of 0.15 and the pH is adjusted to about 7.5. Sodium ethylmercuricthiosalicylate is then added to a final concentration of 1 gram per 10,000 milliliters. The material is thereafter sterile-filtered in a standard manner.

We claim:

1. The process of purifying and recovering plasminogen from human placental sources which comprises suspending a material from the group consisting of fraction III$_2$ and the euglobulin fraction in alkaline water at a pH of between about 8 and 11.5, acidifying the suspension to a pH of between 1 and 4, adjusting the ionic concentration of the suspension to between 0.15–0.70 so as to flocculate the impurities contained therein, removing the flocculated impurities, and thereafter adjusting the pH of the solution to between about 6–9.

2. The process of purifying and recovering plasminogen from human placental sources which comprises suspending a material of the group consisting of fraction III$_2$ and the euglobulin fraction in alkaline water at a pH of between about 8 and 11.5, acidifying the suspension to a pH of between 1 and 4, adding salt thereto in sufficient quantity to obtain an ionic strength of 0.15–0.70 so as to flocculate the impurities contained therein, removing the flocculated impurities, adding a quantity of washed activated magnesium silicate to the resulting solution so as to adsorb the plasminogen thereon while maintaining the pH of the solution between about 4–7, eluting the plasminogen from the adsorbent by an acid elution step at a pH of about 2–3, adding salt to the eluate in amounts sufficient to obtain an ionic strength of about 0.15–0.70, and thereafter adjusting the pH of the solution to between about 6–9.

3. The process according to claim 2 in which the magnesium silicate is added to a concentration of between 1–5%.

4. The process according to claim 2 in which the salt is sodium chloride.

References Cited in the file of this patent

UNITED STATES PATENTS 2,385,803   Cohen _____ Oct. 2, 1945
2,390,074   Cohen _____ Dec. 4, 1945

OTHER REFERENCES

Leonard et al.: J. Infect. Diseases, vol. 53, 1933, p. 376.

Cohen et al.: J. Am. Chem. Soc., vol. 68, March 1946, pp. 459–474.

Remmert et al.: J. Biol. Chem., vol. 181, November 1949, pp. 431–447.

Christensen et al.: J. of the Soc. for Experimental Biol. and Med. 74:4, August 1950, pp. 840–844.

Cliffton et al.: J. of Applied Physiology 6:1, July 1953, pp. 42–50.